(12) United States Patent
Haga

(10) Patent No.: US 7,005,095 B2
(45) Date of Patent: Feb. 28, 2006

(54) PROCESS FOR PRODUCTION OF VULCANIZED RUBBER-RESIN COMPOSITES

(75) Inventor: Hiroaki Haga, Fujisawa (JP)

(73) Assignee: NOK Corporation, Tokyo (JP)

( * ) Notice: Subject to any disclaimer, the term of this patent is extended or adjusted under 35 U.S.C. 154(b) by 8 days.

(21) Appl. No.: 10/451,131

(22) PCT Filed: Aug. 6, 2002

(86) PCT No.: PCT/JP02/07994

§ 371 (c)(1),
(2), (4) Date: Jun. 19, 2003

(87) PCT Pub. No.: WO03/016028

PCT Pub. Date: Feb. 27, 2003

(65) Prior Publication Data

US 2004/0113313 A1    Jun. 17, 2004

(30) Foreign Application Priority Data

Aug. 10, 2001    (JP)    ............................ 2001-243184

(51) Int. Cl.
*B29C 65/52* (2006.01)
*B29C 45/14* (2006.01)

(52) U.S. Cl. ...................... 264/135; 264/250; 264/255; 264/265; 264/331.13; 264/331.17; 156/307.3; 156/333

(58) Field of Classification Search ................ 264/135, 264/250, 255, 265, 279, 331.13, 331.15, 264/331.17; 524/601, 606; 156/307.3, 333
See application file for complete search history.

(56) References Cited

U.S. PATENT DOCUMENTS

| | | | |
|---|---|---|---|
| 2,837,458 A * | 6/1958 | Coleman, Jr. ................ 428/419 |
| 3,258,389 A | 6/1966 | Coleman et al. |
| 3,826,772 A | 7/1974 | Gebhard et al. |
| 4,205,150 A * | 5/1980 | Marubashi ................... 526/252 |
| 4,300,970 A | 11/1981 | Honda et al. |
| 4,957,677 A * | 9/1990 | Katoh et al. ................. 264/135 |
| 4,988,753 A | 1/1991 | Rullmann et al. |
| 4,994,222 A * | 2/1991 | Iizumi et al. ................ 264/135 |
| 4,994,519 A * | 2/1991 | Scheer ........................ 524/519 |
| 5,306,740 A | 4/1994 | Laas et al. |
| 5,534,591 A | 7/1996 | Ozawa et al. |
| 5,681,891 A * | 10/1997 | Satoh et al. ................. 524/767 |
| 5,922,476 A * | 7/1999 | Arita et al. .................. 428/515 |
| 6,357,802 B1 * | 3/2002 | Nozato et al. .............. 285/340 |
| 6,620,517 B1 * | 9/2003 | Kazuno et al. ............. 428/448 |

FOREIGN PATENT DOCUMENTS

| | | |
|---|---|---|
| EP | 0 627 456 A1 | 12/1994 |
| EP | 0 739 931 A1 | 10/1996 |
| JP | 9-94918 | 4/1997 |
| JP | 10-202691 A | 8/1998 |
| WO | WO 95/18835 | 7/1995 |

* cited by examiner

*Primary Examiner*—Angela Ortiz
(74) *Attorney, Agent, or Firm*—Butzel Long

(57) ABSTRACT

In the production of a vulcanized rubber-resin composite material by providing a vulcanized rubber molding in a mold, followed by injecting a resin into the mold, a vulcanizable adhesive layer containing brominated poly(2,3-dichlorobutadiene-1,3) as the main component is formed on the surface to be bonded of the vulcanized rubber molding, and then injecting the resin while keeping the vulcanizable adhesive layer to stay as formed on the surface to be bonded, thereby effecting the bonding, where a strong adhesion is established between the vulcanized rubber molding and the resin layer without any heat treatment of the vulcanized rubber molding before provision of the vulcanized rubber molding in the mold or without any heat treatment of the composite material after the resin injection.

7 Claims, No Drawings

PROCESS FOR PRODUCTION OF VULCANIZED RUBBER-RESIN COMPOSITES

TECHNICAL FIELD

The present invention relates to a process for producing a vulcanized rubber-resin composite material and more particularly to a process for producing a vulcanized rubber-resin composite material with a considerably improved bonding strength.

BACKGROUND ART

Engineering plastics have distinguished characteristics such as a high mechanical strength, a high creep resistance, etc. and thus are widely used in various fields as a substitute for metals. Even in the fields of industrial rubber products and automobile vibration-absorbing rubber products, formation of rubber-resin composite materials based on resins has been now in progress.

Conventional processes for producing rubber-resin composite materials such as rubber-bushed plastic rods, bushes, engine mounts, etc. include a process, which comprises applying a rubber-based adhesive to resin moldings, followed by vulcanization bonding to an unvulcanized rubber, but the process suffers from such problems as occurrence of deformation or physical property degradation of the resin moldings due to the mold-inside heat, a prolonged time for elevating the temperature of resin moldings up to a necessary temperature for the vulcanization and an inevitable production cost increase due to a longer time than that required for the vulcanization of metal-rubber.

As one of the processes applicable to production of the aforementioned bushed plastic rods, a process, which comprises providing a vulcanized rubber molding in a mold, followed by injection molding a molten resin into the mold (JP-B-7-55510), where the desired surface of the vulcanized rubber molding for bonding to the resin is subjected to a treatment according to a method (1) comprising a chlorination and application of a vulcanizable adhesive containing a resol type phenol resin and an aldehyde-modified polyvinyl alcohol as the main components or according to a method (2) comprising application of a vulcanizable adhesive containing chlorosulfonated polyethylene as the main component.

The above-mentioned method (1) suffers not only from diffusion of an organic solvent used in the chlorination into the atmosphere and an influence on workers or a cost increase in fire-preventive facility, etc. due to the use of the organic solvent, but also from a fear of development of crack generation-starting points when a shearing force is applied to the chlorinated vulcanized rubber molding itself. The method (2) requires a heat treatment (prebaking) of the adhesive-applied vulcanized rubber molding in advance to the injection of the molten resin into the mold and also requires a heat treatment of the vulcanized-resin composite material after the injection. No stable quality bonding can be obtained unless such a heat treatment is carried out fully.

DISCLOSURE OF THE INVENTION

An object of the present invention is to provide a process for producing a vulcanized rubber-resin composite material by providing a vulcanized rubber molding in a mold, followed by injecting a resin into the mold, the process being capable of establishing a strong adhesion between the vulcanized rubber molding and the resin layer without any heat treatment before the provision of the vulcanized rubber molding in the mold or without any heat treatment of the composite material after the resin injection.

In the process for producing the aforementioned composite materials, the object of the present invention can be attained by forming a vulcanizable adhesive layer containing brominated poly(2,3-dichlorobutadiene-1,3) as the main component on the surface to be bonded of the vulcanized rubber molding, and then injecting the resin into the mold while keeping the vulcanizable adhesive layer to stay as formed on the surface to be bonded, thereby effecting the bonding.

The vulcanized rubber molding to be provided in the mold in advance is at least one of vulcanized moldings of various synthetic rubbers and natural rubber, where the rubber components are not particularly limited, but those with carbon—carbon double bonds in the molecules are preferable. Synthetic rubbers include, for example, butadiene rubber, isoprene rubber, butyl rubber, NBR, SBR, EPDM, etc. These rubber components are properly blended with a filler such as carbon black, silica, calcium carbonate, graphite, etc., an antioxidant, a lubricant, a vulcanizing agent, a vulcanization additive, a vulcanization accelerator, etc., followed by thorough kneading by the ordinary kneading method and subsequently vulcanization molding in any vulcanization mold kept ready in advance under appropriate vulcanization conditions depending on the kind of the rubber components.

A vulcanizable adhesive containing brominated poly(2,3-dichlorobutadiene-1,3) as the main component, as dissolved or dispersed in an organic solvent, is applied to the surface to be bonded of the vulcanized rubber molding by any method such as brush coating, spraying, dipping, etc. to form a vulcanizable adhesive layer thereon to a thickness of about 5- about 50 $\mu$m.

Brominated poly(2,3-dichlorolbutadiene-1,3) is a well known substance obtained by brominating poly(2,3-dichlorobutadiene-1,3). For example, Japanese Patent No. 2,927,369 (WO 95/18835) or U.S. Pat. No. 5,534,591 discloses use of poly(2,3-dichlorobutadiene-1,3) containing 23 wt. % Br as a film-formable component of a chlorinated polyolefin adhesive composition for bonding a metal to an elastomer material. In the present invention, brominated poly(2,3-dichlorobutadiene-1,3) containing about 10- about 27 wt. % Br is used, but practically commercially available organic solvent types, for example, Chemlock 225, a product of LOAD Co., etc. can be used as such.

Resin is injected into the mold provided with the vulcanized rubber molding, on which a vulcanizable adhesive layer is previously formed by aforementioned method, and bonded thereto through the vulcanizable adhesive layer formed thereon. The resin to be injected includes, for example, polyamide, polyphenylene sulfide, polyethylene terephthalate, polybutylene terephthalate, etc., and preferable for use is a polyamide resin having amide bonds in the main chain. Furthermore, to improve the mechanical strength characteristic of the resin itself, a reinforcing agent such as glass fibers, carbon fibers, whiskers, etc., a filler such as carbon black, silica, calcium carbonate, etc. can be added to the resin within such a range as not to deteriorate the processability, practically in a proportion of not more than about 60 wt. %.

BEST MODE FOR CARRYING OUT THE INVENTION

The present invention will be described below, referring to Examples.

EXAMPLE 1

| | |
|---|---|
| Natural rubber | 100 parts by weight |
| FEF carbon black | 20 parts by weight |
| Zink white | 5 parts by weight |
| Stearic acid | 1 parts by weight |
| Plaslicizer (naphthene series oil) | 5 parts by weight |
| Antioxidant (Nocrac 3C, a product by Ouchi-Shinko Kagaku K. K.) | 2.5 parts by weight |
| Antioxidant (Nocrac 224, a product by Ouchi-Shinko Kagaku K. K.) | 2.5 parts by weight |
| Sulfur | 1.5 parts by weight |
| Vulcanization acceleralator (NOCCELER TS, a product by Ouchi-Shinko Kagaku K.K.) | 2 parts by weight |

A test piece in the size of 17×80×7.5 mm was made from a natural rubber composition comprising the aforementioned blend components by vulcanization molding. The test piece was in such a shape that the upper right half portion (17×40×3 mm) was cut away.

A vulcanizable adhesive (Chemlock 225, a product by LOAD Co.) containing brominated poly(2,3-dichlorobutadiene-1,3) was applied to the to-be-bonded test piece surface corresponding to the cut-away portion, followed by providing the test piece in a mold without prebaking and injection molding molten nylon-6,6 (filled with 50% glass fibers) therein, thereby bonding the test piece surface corresponding to the cut-away portion to the molten nylon-6,6.

EXAMPLE 2

In Example 1, molten polyethylene terephthalate (filled with 30% glass fibers) was used in place of the molten nylon-6,6 (filled with 50% glass fibers).

EXAMPLE 3

In Example 1, natural rubber/butadiene rubber (in a weight ratio of 70/30) blend rubber was used in the same amount in place of the natural rubber.

EXAMPLE 4

In Example 1, SBR was used in the same amount in place of the natural rubber.

COMPARATIVE EXAMPLE 1

In Example 1, a vulcanizable adhesive containing chiorosulfonated polyethylene as the main component (Chemlock 252, a product by LOAD Co.) was used.

COMPARATIVE EXAMPLE 2

In Comparative Example 1, a vulcanized molding subjected to a prebaking treatment at 120° C. for 30 minutes was used.

COMPARATIVE EXAMPLE 3

In Comparative Example 2, the resulting composite material was subjected to a heat treatment at 120° C. for 60 minutes.

The composite materials prepared in the foregoing Examples and Comparative Examples were subjected to determination of bonding strength according to 90 ° peeling test procedure of JIS K-6256, determination of rubber retention and observation of broken state. The results are shown in the following Table.

TABLE

| Example | Bonding strength (KN/m) | Rubber retention (%) | Broken state |
|---|---|---|---|
| Example 1 | 14.5 | 100 | Thick rubber layer was retained |
| Example 2 | 14.5 | 100 | Thick rubber layer was retained |
| Example 3 | 13.0 | 100 | Thick rubber layer was retained |
| Example 4 | 11.5 | 100 | Thick rubber layer was retained |
| Comp. Ex. 1 | 8.5 | 60 | Thin rubber layer was retained |
| Comp. Ex. 2 | 12.3 | 85 | Thin rubber layer was retained |
| Comp. Ex. 3 | 14.2 | 95 | Thin rubber layer was retained |

INDUSTRIAL APPLICABILITY

According to the present process, vulcanized rubber-resin composite materials in firm and stable bonding between vulcanized rubber moldings and resins can be easily produced at a low cost without such a chlorination treatment or a heat treatment as in the conventional process. As to the heat treatment, in the case of using a vulcanizable adhesive containing chlorosulfonated polyethylene as the main component, no satisfactory adhesion is obtained without prebaking of vulcanized rubber moldings prior to the resin injection or without heat treatment of the composite materials after the injection, whereas in the present process vulcanized rubber-resin composite materials with satisfactory adhesion and bonding strength can be obtained without prebaking prior to the resin injection and without heat treatment after the resin injection.

The present process with such features can be effectively used in the production of automobile bushes, engine mounts, etc.

The invention claimed is:

1. A process for producing a vulcanized rubber-resin composite material by providing a vulcanized rubber molding in a mold, followed by injecting a resin into the mold, which process comprises forming a vuicanizable adhesive layer containing broininated poly(2,3-dichlorobutadiene-1,3) as the main vulcanizing adhesive component on the surface to be bonded of the vulcanized rubber molding, and then injecting the resin into the mold while keeping the vulcanizable adhesive layer to stay as formed on the surface to be bonded, thereby effecting the bonding, wherein neither heat treatment of the vulcanized rubber molding before provision in the mold nor heat treatment of the composite material after the resin injection is carried out for obtaining stable bonding.

2. A process for producing a vulcanized rubber-resin composite material according to claim 1, wherein a vulcanized molding of rubber having carbon-carbon double bonds in the molecule is used as the vulcanized rubber molding.

3. A process for producing a vulcanized rubber-resin composite material according to claim 2, wherein the rubber having carbon-carbon double bonds in the molecule is natural rubber.

4. A process for producing a vulcanized rubber-resin composite material according to claim 2, wherein the rubber having carbon-carbon double bonds in the molecule is butadiene rubber, isoprene rubber, butyl rubber, NBR, SBR or EPDM.

5. A process for producing a vulcanized rubber-resin composite material according to claim 1, wherein the resin to be injected is polyamide, polyphenylene sulfide, polyethylene terephthalate or polybutylene terephthalate.

6. A process for producing a vulcanized rubber-resin composite material according to claim 5, wherein the resin to be injected contains a filler.

7. A process for producing a vulcanized rubber-resin composite material according to claim 1, wherein the vulcanized rubber-resin composite material is directed to an automobile bushing or an engine mount.

* * * * *